Nov. 17, 1959    J. A. WHALEY    2,913,659
TESTING DEVICE FOR SPARK PLUGS
Filed June 6, 1956
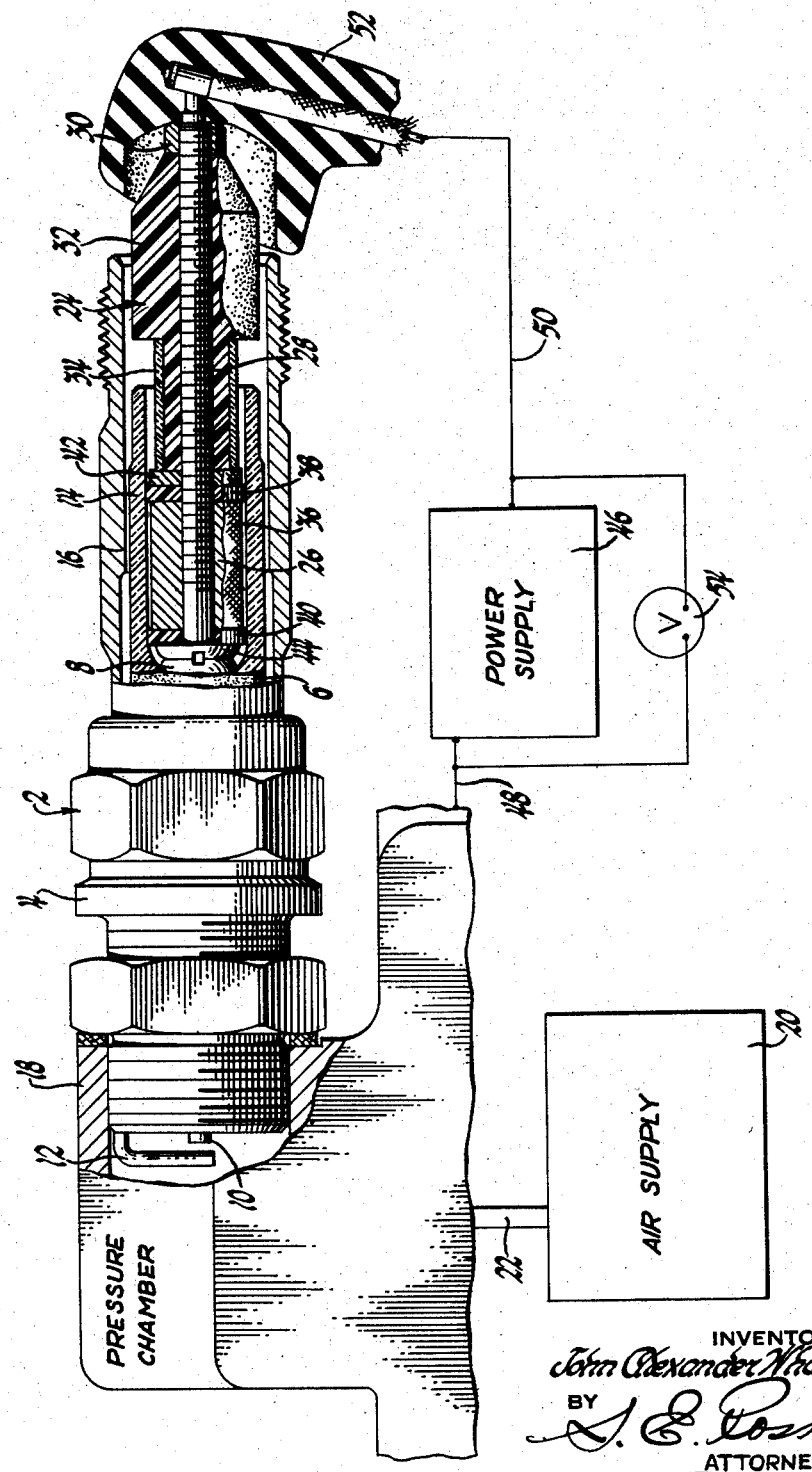
INVENTOR
John Alexander Whaley
BY
J. E. Ross
ATTORNEY United States Patent Office 2,913,659
Patented Nov. 17, 1959

2,913,659

TESTING DEVICE FOR SPARK PLUGS

John A. Whaley, Flint, Mich., assignor to General Motors Corporation, Detroit, Mich., a corporation of Delaware Application June 6, 1956, Serial No. 589,774

7 Claims. (Cl. 324—15)

This invention relates to a spark plug testing device and, more particularly, to a device for testing spark plugs of aircraft type, i.e., spark plugs having a shielded insulator well adapted to receive an ignition cable.

Because of the method and apparatus heretofore used to test for electrical failures (due to defective insulators) in aircraft spark plugs, it has been the practice to quench the spark gap or, in other words, prevent arcing at the spark gap, by means of oil or a similar insulating liquid, as distinguished from compressed air which is generally used as a quenching medium in making the same type of test on automotive spark plugs, this because an oil quench will allow the application of higher potentials than will a compressed air quench at practical pressures. Apparatus for accomplishing an oil quench is considerably more expensive, complicated and troublesome than is apparatus for accomplishing a compressed air quench.

It is an object of the present invention to provide an improved device for testing aircraft type spark plugs for electrical failures, which is of simple and low cost construction and yet which accomplishes a more satisfactory test than those heretofore accomplished by a more complex and expensive apparatus.

Another object of the invention is the provision of an improved adapter device useful to accommodate a compressed air quench type spark plug tester for the testing of aircraft and similar spark plugs having a shielded insulator well.

Other objects and advantages of the invention will appear more clearly from the following description of a preferred embodiment and from the accompanying drawing thereof which shows the improved apparatus and adapter device, schematically as to some portions and in section and with parts broken away as to other portions, in its operative position to test an aircraft type spark plug.

In the drawing, 2 is an aircraft type spark plug of the usual construction and includes a metal shell 4 having concentrically secured therewithin a ceramic insulator 6 through which extends a center electrode, the upper electrical contact of which is shown at 8 and the firing tip of which is shown at 10. The ground electrode 12 is secured as by welding or the like to the base of the shell 4 in accordance with the usual practice. The upper portion 14 of the insulator is in the form of a tube concentrically surrounded by a metal shielding barrel 16 which is brazed or otherwise suitably secured to the spark plug shell 4. The bore of the insulator tubular portion 14 forms a deep well adapted to receive an ignition cable and electrical contact when the spark plug is installed in its operative position in an internal combustion engine.

The spark plug 2 being tested has its lower or sparking end inserted and sealed air tight into a metal air pressure chamber 18. Suitable air pressure supply means 20 is connected with the air pressure chamber as shown at 22 to thereby supply sufficient air pressure to prevent sparking across the electrodes 10 and 12 of the spark plug until a predetermined potential has been applied. Sufficient air pressure can conveniently be supplied by low cost apparatus to prevent sparking at up to about 15 kv.

Positioned within the insulator well is the conducting member or adapter 24. This adapter comprises an elongated cylindrical plug 26 made of a highly conductive metal such as brass or copper, having secured thereto and extending upwardly therefrom an elongated electrical conductor 28 terminating with an electric contact button 30. The portion of the conductor 28 between the plug and the contact button is surrounded by insulator 32. The lower portion of this insulator 32, or the portion which is adjacent the plug 26 and which, when the adapter is in its operative position as shown, is positioned within the spark plug insulator well or just above it, has a surface of high heat and spark erosion resistant material. In the embodiment shown, such a surface is provided by a glass tube 34 which surrounds the lower portion of reduced diameter of the insulator body 32, said insulator body being formed of organic polymeric material such as phenol formaldehyde, nylon or the like. If desired, the entire insulator surrounding conductor 28 may be of glass, alumina or other suitable ceramic, and of unitary construction, the surface of such insulator providing the necessary high heat and spark erosion resistance.

For reasons mentioned hereinafter the entire cylindrical surface of metal plug 26 is covered with integral pointed projections such as may be formed by knurling, as indicated at 36.

It is important that the distance between the cylindrical surface of the metal plug 26 and the insulator tubular portion 14 be at a minimum; but at the same time, it is important that the metal plug not leave deposits on the insulator such as would reduce its electrical resistance and interfere with proper operation of the spark plug. To accomplish these objects, the plug 24 is provided with two spaced narrow rings 38 and 40 of an organic polymeric material such as nylon, the exterior surfaces of which extend slightly beyond the knurled cylindrical surface of the plug so as to allow close spacing, but without contact, between the plug and the ceramic tube. To facilitate assembly of the nylon rings, the plug 26 is formed in two parts, one below and one, shown at 42, above ring 38; however, if desired, the rings could be secured in grooves formed in a one-piece plug construction.

As will be evident from the drawing, the above-described structure of the adapter 24 may be accomplished in a simple and inexpensive manner by forming the elongated conductor with a contact head 44 at one end and with threads at the other end, contact button 30 taking the form of a nut threadedly engaged with the conductor. Thus, to assemble the adapter, the various elements 40, 26, 38, 42, etc., may be stacked onto the conductor 28 and secured thereto by means of the nut 30.

The remaining parts of the test device comprise a suitable power supply means 46 to provide a potential of up to or perhaps in excess of 15 kv., electrically connected, as by conductor 48, to the metal air pressure chamber 18, and to the contact button 30 of the adapter by conductor 50 and the insulated electrical connector assembly 52. A meter 54 to indicate the potential applied is included at some convenient point in the electric circuit.

The various advantages of the above-described apparatus and the significance and importance of the various structural features thereof will be more clear from the following description of its operation.

The sparking end of the spark plug 4 to be tested is inserted in an air-tight manner into the pressure chamber 18, the adapter 24 inserted in the insulator well and the power supply 46 electrically connected to the adapter, all as shown in the accompanying drawing. After air pressure is applied to the chamber 18 by the air supply means, the power supply is actuated thereby creating a potential between the spark plug shell, as well as all parts electrically connected thereto, and the conductor 28 and plug 26 plus all parts electrically connected to said conductor and plug. Since the electrode gap is quenched up to, say, 15 kv., no arcing can occur between electrodes 10 and 12 until 15 kv. are applied. If there is any defect in the structure of the spark plug insulator 6, below the centerwire contact member 8, electrical leakage will occur from the spark plug centerwire to the metal shell, this being indicated by meter 54. If the spark plug insulator is defective above the centerwire contact member 8, electrical leakage will occur between the knurled metal plug 26 and the spark plug metal shielding barrel 16. Such leakage would also be indicated by meter 54. However, if the insulator is not defective, no arcing will occur until there is reached that potential required to cause arcing between the upper surface of plug 26 and the surface of the shielding barrel 16 just above the insulator 6. When such arcing does occur, it indicates a satisfactory spark plug insulator. The adapter is protected against this arcing by the heat and spark erosion resistant surface of the glass tube 34.

As indicated previously, it would be disadvantageous to allow physical contact between the surface of the plug 26 and insulator 6, and for this reason a small air space is provided between them. In accordance with the invention adequate compensation is made for the added electrical resistance of this air space by the pointed projections on the surface of the plug 26. As is well known, a smaller potential is required to cause arcing from a pointed projection than from a smooth surface. Thus, the electrical resistance of the insulator wall plus the small air space, to a given potential applied through the pointed projections on the plug 26 constitutes as critical a test of the insulating properties of the insulator wall as would a higher potential applied from a smooth surface abutting the insulator wall.

In order to obtain an electrical test of an aircraft type spark plug as crucial as that attained by the present invention, it has heretofore been the practice to insert a cable, insulated its entire length, into the spark plug well until electrical contact was made with the spark plug centerwire at 8, quench the spark gap, and then increase the potential until arcing occurred all the way from centerwire contact 8 to the shielding barrel 14 above the insulator. Due to the distance of such arcing, something on the order of 20 kv. or higher was required thereby necessitating an oil quench. It will be seen that in accordance with the present invention a fully satisfactory and sufficiently crucial electrical test may be accomplished with simpler and much less expensive equipment. The entire test apparatus other than the adapter 24 may be the same or substantially similar to that presently used for automotive spark plugs. Thus, provision of the adapter 24 allows a spark plug test installation to be adapted to the testing of either aircraft or automotive spark plugs. If the apparatus is to be used exclusively for the testing of aircraft spark plugs, it will be obvious that the adapter 24 may be permanently secured to and form a part of the connector assembly indicated at 52.

It will be understood that other changes and alterations may be made, all within the full and intended scope of the claims which follow.

I claim:

1. An adapter device for testing spark plugs of the type having a shielded cylindrical insulator well, said adapter comprising a cylindrical metal plug adapted to fit in the lower end of said well, the diameter of said plug being only slightly less than the diameter of said well such that the cylindrical surface of said plug is in close spaced relationship with the surface of said well, an elongated electrical conductor secured in electrical contact with said metal plug and adapted to extend through the upper end and to the exterior of said well, and a tubular electrical insulator having high heat and spark erosion resistance surrounding that portion of said electrical conductor adjacent to said metal plug.

2. An adapter device for testing spark plugs of the type having a shielded insulator well comprising an elongated cylindrical metal plug adapted to fit in the lower end of said well and having its surface formed with a multiplicity of pointed projections, an elongated electrical conductor secured in electrical contact with said metal plug and adapted to extend through the upper end and to the exterior of said well, and a tubular electrical insulator having high heat and spark erosion resistance surrounding that portion of said electrical conductor adjacent to said metal plug.

3. An adapter device for testing spark plugs of the type having a shielded insulator well comprising an elongated cylindrical metal plug adapted to fit in the lower end of said well and having its surface formed with a multiplicity of pointed projections, a pair of spaced rings of insulation material extending around and secured to the cylindrical surface of said metal plug, an elongated electrical conductor secured in electrical contact with said metal plug and adapted to extend through the upper end and to the exterior of said well, and a tubular electrical insulator having high heat and spark erosion resistance surrounding that portion of said electrical conductor adjacent to said metal plug.

4. An adapter device for testing spark plugs of the type having a shielded insulator well comprising an elongated cylindrical metal plug adapted to fit in the lower end of said well and having its surface formed with a multiplicity of pointed projections, a pair of spaced rings of organic polymeric material extending around and secured to the cylindrical surface of said metal plug, an elongated electrical conductor secured in electrical contact with said metal plug and adapted to extend through the upper end and to the exterior of said well, and a tubular electrical insulator surrounding said elongated electrical conductor, at least that portion of the surface of said insulator adjacent said metal plug being of a ceramic material having high heat and spark erosion resistance.

5. An adapter device for testing spark plugs of the type having a shielded insulator well comprising an elongated cylindrical metal plug adapted to fit in the lower end of said well and having a knurled cylindrical surface, a pair of spaced rings of organic polymeric material extending around and secured to the cylindrical surface of said metal plug, an elongated electrical conductor having one end secured in electrical contact with said metal plug and an electric contact member at the oppositely disposed end thereof, an electrical insulator surrounding said elongated electrical conductor between said contact member and said metal plug, that portion of said insulator adjacent said metal plug being of reduced diameter and surrounded by a glass tube of high heat and spark erosion resistance.

6. A device for testing a spark plug of the type having a shielded insulator well comprising a metal air pressure chamber adapted to receive the sparking end of the spark plug, means for supplying air pressure to said chamber, a conductor member adapted to fit in the insulator well of said spark plug, and means for supplying and measuring an electrical potential between said conductor member and said pressure chamber, said conductor member comprising an elongated cylindrical metal plug adapted to fit in the lower end of said insulator well and having its surface formed with a multiplicity of pointed projections, an elongated electrical conductor secured in electrical contact with said metal plug and adapted to extend through the upper end and to the exterior of said insulator well, and a tubular insulator of high heat and spark erosion resistant material surrounding that portion of said electrical conductor adjacent said metal plug.

7. A device for testing a spark plug of the type having a shielded insulator well comprising a metal air pressure chamber adapted to receive the sparking end of the spark plug, means for supplying air pressure to said chamber, a conductor member adapted to fit in the insulator well of said spark plug, and means for supplying and measuring an electrical potential between said conductor member and said pressure chamber, said conductor member comprising an elongated cylindrical metal plug adapted to fit in the lower end of said well and having a knurled cylindrical surface, a pair of spaced insulator rings surrounding and secured to the cylindrical surface of said metal plug, an elongated electrical conductor secured in electrical contact with said metal plug and adapted to extend through the upper end and to the exterior of said well, and a tubular insulator surrounding said electrical conductor, at least that portion of the surface of said tubular insulator adjacent said plug being of a high heat and spark erosion resistant material.

References Cited in the file of this patent

UNITED STATES PATENTS

| | | |
|---|---|---|
| 2,244,404 | Saunders | June 3, 1941 |
| 2,306,529 | Davis | Dec. 29, 1942 |
| 2,396,172 | Groven et al. | Mar. 5, 1946 |
| 2,398,359 | Curtis | Apr. 16, 1946 |
| 2,685,059 | Pierce et al. | July 27, 1954 |
| 2,695,390 | Woolston et al. | Nov. 23, 1954 |
| 2,802,175 | Eldridge | Aug. 6, 1957 |